United States Patent [19]
Cornsweet et al.

[11] 3,712,716
[45] Jan. 23, 1973

[54] EYE TRACKER

[75] Inventors: Tom N. Cornsweet, Atherton, Calif. 20015; Hewitt D. Crane, Portola Valley, Calif.

[73] Assignee: Stanford Research Institute, Menlo Park, Calif.

[22] Filed: April 9, 1971

[21] Appl. No.: 132,678

[52] U.S. Cl. ..................351/7, 250/206, 250/221, 340/279, 351/6, 351/9, 351/14, 351/16
[51] Int. Cl. .................................................A61b 3/10
[58] Field of Search............351/1, 6, 7, 9, 14, 16, 39; 250/206, 221; 340/279

[56]  References Cited

UNITED STATES PATENTS 3,462,604  8/1969  Mason..................................351/6 X
3,973,868  10/1969  Young et al. .........................351/7 X

*Primary Examiner*—David Schonberg
*Assistant Examiner*—Paul A. Sacher
*Attorney*—Flehr, Hohbach, Test, Albritton & Herbert

[57] ABSTRACT

An eye tracker for continuously tracking orientation of the optic axis of an eye in which the eye is flooded with light so that Purkinje images are formed. Two of the Purkinje images are deflected so as to be incident on photodetectors. In one embodiment the detectors and the light source are moved so that the light sources move to keep the Purkinje images centered on the two photodetectors with a fixed distance between the images. The positions of the light source in order to obtain the predetermined distance between the Purkinje images is monitored and gives an indication of the orientation of the optic axis of the eye. In another embodiment only one photodetector is used with two alternating light sources and means are provided to form the two Purkinje images respectively from the two light sources. Further means are provided with the photodetector for differentiating between the two Purkinje images.

12 Claims, 5 Drawing Figures

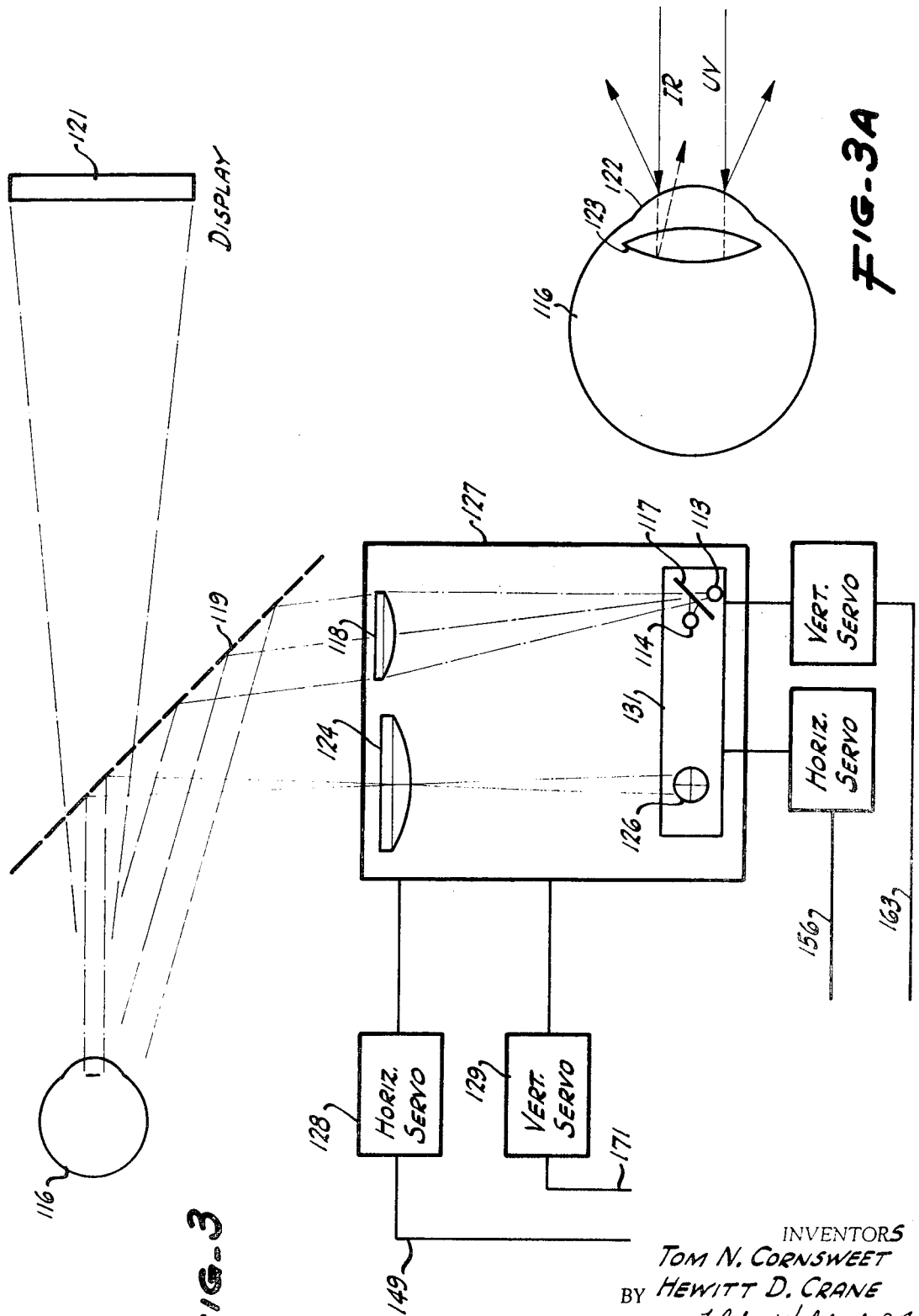

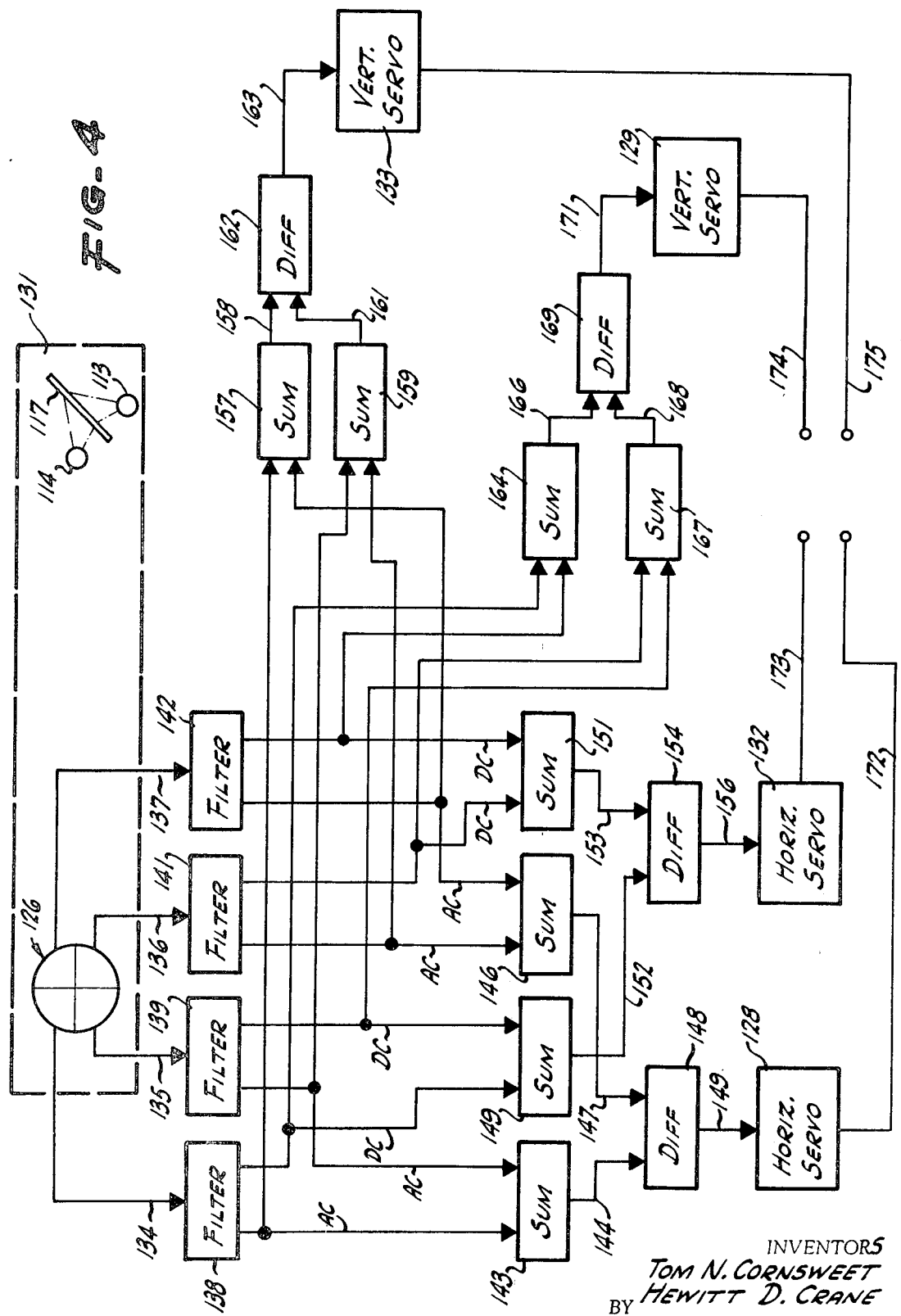

EYE TRACKER

BACKGROUND OF THE INVENTION

This invention pertains to an eye tracker and more particularly pertains to an eye tracker for continuously tracking orientation of the optic axis of an eye by monitoring Purkinje images formed by reflecting surfaces within the eye.

There are many areas of both research and possibilities for commercial application in which it is desireable to have available electrical signals proportional to the orientation of the optic axis of a human observer's eye. Research on the mechanics of the eye movements, on many areas of visual perception and on visual search patterns would all be greatly aided by such a device. Commercial applications include the use of the eye to control other systems. For example, a computer operator might simply look at any one of a number of symbols or locations displayed in front of him and press a button, introducing the value corresponding to that location into the computer. Similarly, a servosystem for controlling a gun or camera could automatically be aimed at whatever object an observer visually was fixating.

The prior art contains many methods for attempting to track eye movement. In one such method a tightly fitting contact lens is attached to the eye and and either a light source, a mirror, or a coil of wire is attached to the lens. Movements of the eye can then be monitored by electro-optical tracking or photography. This method has the obvious shortcoming that the lens must fit tightly on the eye, producing some discomfort. Further, in order to get a tight fit, either each lens must be individually constructed to fit the particular observer or the observer's eye must be anesthetized and the lens attached with suction, a difficult and slightly risky procedure.

Another prior art technique for tracking eye movements is the electro-oculogram. This method is based upon the fact that physiological events within any mammalian eye result in the maintenance of a voltage between the cornea and the surrounding tissue, such as the forehead. Therefore, if two electrodes are placed, say, one on the skin above the the other below the eyeball, vertical rotations of the eye will result in corresponding changes in the voltage between the electrodes. A recording of such a voltage is called an electro-oculogram. The accuracy of this technique is limited by many factors, such as the slow changes in the resting potential with time of day, state of adaption, etc. Further, the electrical noise level resulting from stray bioelectric potential limit the resolution of this technique.

Another prior art eye tracking technique can be described as tracking a feature of the front of the eye. When the eye rotates in is socket, the location of any feature of the front of the eye, such as the iris or a blood vessel on the white, moves accordingly. Therefore, photography or electro-optical tracking of such a feature provides a method of recording eye position. When the eye rotates horizontally, the front of the eye moves horizontally. If the head moves sideways, however, the eyeball shifts sideways in its socket and the front of the eye also moves horizontally. Therefore, using these techniques, there is no way to distinguish lateral movements of the eye from rotations of the eye. For example, a rotation of one degree moves the front of the eye through 0.2 mm., and is thus indistinguishable from a lateral shift of 0.2 mm. On the other hand, the visual effects of rotations are drastically different from those of translation. If the object being viewed is two meters away, a lateral movement of 0.2 mm. changes the place being looked at by 0.2 mm., while the rotation of one degree (which looks the same to the recording device) changes that place by 35 mm. And the farther away the target is, the larger becomes the discrepancy between the effects of lateral and rotational movement. Therefore, when the technique used to record eye movements involves the monitoring of the location of any point on the front of the eye, lateral movements result in artifacts. Since it is impossible to prevent the eye from moving laterally in its socket, the error of these techniques cannot be less than about 15 to 30 minutes of arc (corresponding to lateral shifts of the eye of 0.05 to 0.1 mm.).

Another prior art technique for eye tracking is what is known as an oculometer. The oculometer tracks the corneal reflection and the inside edge of the iris. Because the center of curvature of the cornea is at a somewhat different distance from the center of curvature of the eye than the plane of the iris, these two "landmarks" move with respect to each other under eye rotation but not under translation. What the oculometer basically does is measure the relative position of the corneal reflection with respect to the center of the pupil of the eye. Although it is immune to the effects of translation of the eye it has an inherent problem. This problem is that the iris muscle changes its state, changing the size of the pupil, as a function of a number of factors, such as light intensity, emotional state, state of focus of the eye, etc. While the oculometer might not be bothered directly by changes in the diameter of the pupil, it would be affected by unsymmetrical changes in pupil size. As is well known to those skilled in the art, it is extremely rare to find someone whose pupils contract symmetrically. It is almost always the case that when the pupil changes its size, its center changes position with respect to the eye, just because the iris muscle does not contract exactly symmetrically. Very slight asymmetries in this contraction can cause large errors — a tenth of a millimeter of asymmetry is the equivalent of about a half a degree of error, and normal pupils can change their diameter from 2 to 8 millimeters.

Therefore, what is needed is an improved eye tracker which requires no attachments to the eye and which provides tracking signals much more accurate than ½°, and which is able to track translation as well as rotation of the eye.

SUMMARY OF THE INVENTION

Accordingly, it is an object of this invention to provide an improved method and apparatus for eye tracking which requires no attachments to the eye and provides an accuracy much better than ½°.

It is another object of this invention to provide an accurate method and apparatus for eye tracking which requires no attachments to the eye and which continuously monitors the orientation of the optic axis of the eye.

Briefly, in accordance with one embodiment of the invention, an eye is flooded with light so that a plurality of Purkinje images are formed by reflecting surfaces within the eye. Two of the Purkinje images are monitored by providing deflecting means for imaging them on photodetectors. Servosystems are provided which are responsive to the photodetecting means for moving the photodetecting means and the deflecting means so that the Purkinje images are centered on their respective photodetectors. Therefore, monitoring orientation of the photodetector and the deflecting means gives an indication of where the eye is looking, i.e. the orientation of the optic axis of the eye.

BRIEF DESCRIPTION OF THE DRAWINGS

FIG. 3 is a diagrammatic illustration of another embodiment of an eye tracker which utilizes two sources and one photodetector.

FIG. 3a is a diagrammatic illustration of an eye.

FIG. 4 is a block diagram of the electronics associated with the eye tracker of FIG. 3.

DESCRIPTION OF THE PREFERRED EMBODIMENTS

As light passes through an eye, reflections occur at every interface at which there is a change in dielectric constant. There are in particular four surfaces where such reflections occur. The images formed by these reflections are well known and are generally referred to as Purkinje images. The virtual image of a light source that is formed by light reflected from the front of the cornea is referred to as the first Purkinje image or simply the corneal reflection. A second Purkinje image, formed by light reflected from the rear surface of the cornea, is almost exactly coincident with the first Purkinje image though more than 100 times dimmer because of the much smaller dielectric change from cornea to aqueous. Light that passes through the cornea passes in turn through the aqueous humor and then the lens of the eye. The third Purkinje image, also a virtual image, is formed by light reflected from the front surface of the lens. This image is larger and more diffuse than the other Purkinje images and is formed in a plane relatively far removed from the plane of the other images. The fourth Purkinje image is formed by light reflected from the rear surface of the eye lens, where the lens forms an interface with the vitreous humor that fills the bulk of the eyeball. This rear surface of the lens acts as a concave mirror, forming a real image of the source.

The fourth Purkinje image is almost the same size and is formed in almost exactly the same plane as the first Purkinje image though it is over 100 times less intense. If the eye undergoes translation such as a lateral head movement, both the first and fourth Purkinje images move together through the same distance and direction that the eye moved. If, on the other hand, the eye rotates either horizontally or vertically, the two images change their separation in space because the surfaces that form the first and fourth Purkinje images have centers of curvature that lie at different distances from the center of rotation of the eye. Referred to a fixed point in space, both images move in the direction of rotation of the eye but they move by different amounts. The physical separation between these two images in space is a measure of the angular rotation of the eye in the direction of the shift, and the measure is nominally uncontaminated by lateral movements.

A Purkinje image detector in which a fixed source is utilized with movable photodetectors is described and claimed in applicant's copending patent application entitled "Eyetracker and Method," Ser. No. 132,747 filed Apr. 9, 1971 and assigned to the same assignee as the present application The present application pertains to an improved eyetracker in which the light source is also moved.

Figure 1:
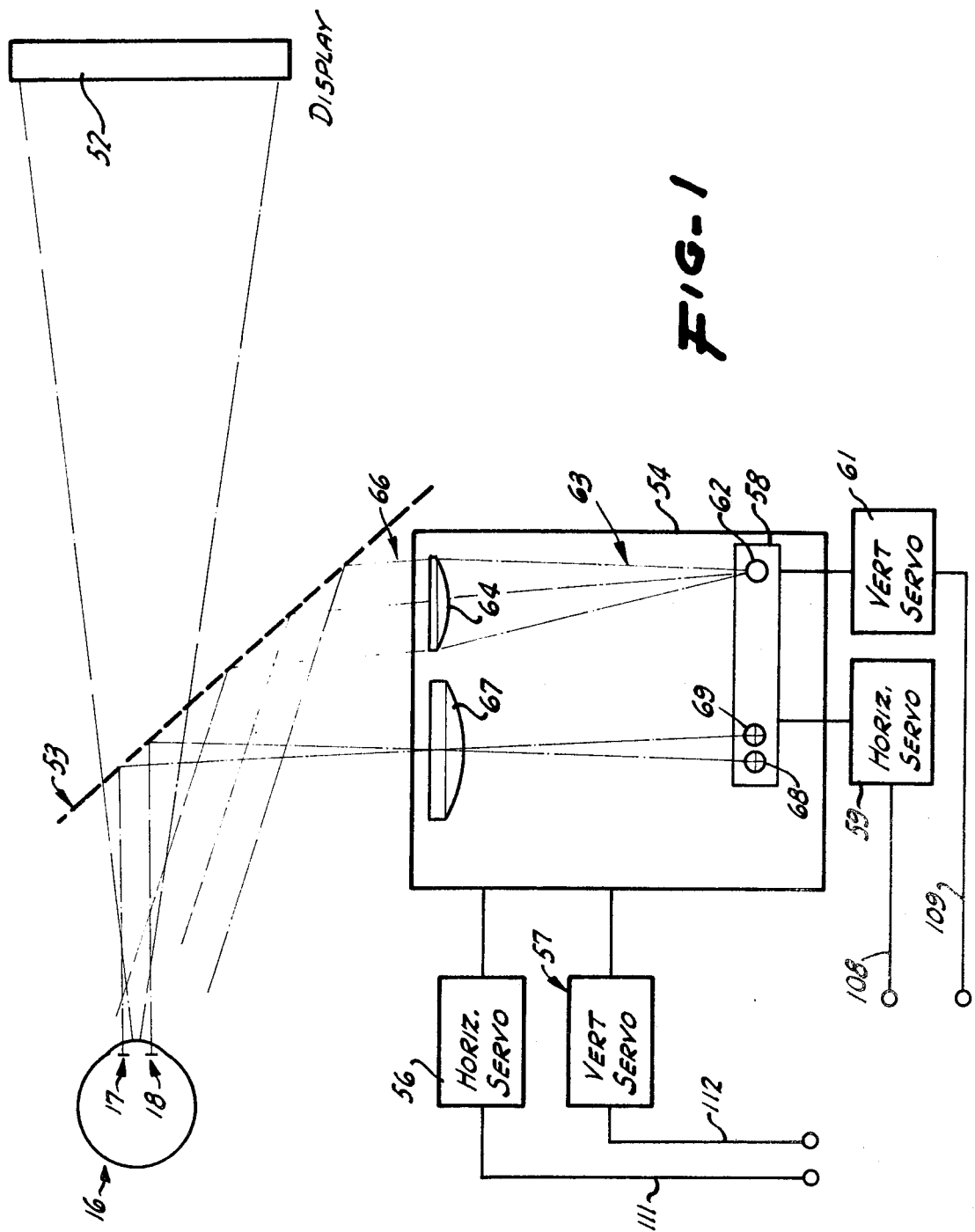
FIG. 1 is a diagrammatic illustration of an embodiment of an eye tracker in which the source is movable.

Referring now to FIG. 1, there is shown one embodiment of the improved eye tracker for tracking eye movements in accordance with this invention. In FIG. 1, an eye 16 is situated at some distance with respect to a display 52. The display 52 may include a number of different areas to which the eye 16 may be visually directed with the movements of the eye being tracked and used to initiate some control function. A dichroic mirror 53 which transmits visible light and reflects infrared light may be disposed at a 45° angle, for example, between the eye 16 and the display 52.

The eye tracker includes a first movable platform 54 driven by a horizontal servosystem 56 for movement in a horizontal direction and also driven by a vertical servosystem 57 for movement in a vertical direction. A second moveable platform 58 is mounted on the first moveable platform 54 and is adapted to be driven by a horizontal servosystem 59 for horizontal movement with respect to the first moveable platform 54 and to be driven by a vertical servosystem 61 for movement in a vertical direction with respect to the first moveable platform 54.

A light source 62 is mounted on the second movable platform 58 and emits a beam of light 63. A lens assembly 64 collimates the light beam 63 to form a collimated light beam 66 which is reflected by the dichroic mirror 53 to flood the eye 16 with infrared light. Purkinje images are formed by reflection of the collimated light beam 66 by the elements within the eye; specifically a first Purkinje image 18 is formed by reflections from the front of the cornea and a fourth Purkinje image 17 is formed by reflections from the rear of the eye lens. Both the first and fourth Purkinje images are formed in essentially the same plane, approximately that of the pupil of the eye. The fourth Purkinje image 17 and the first Purkinje image 18 are reflected by the dichroic mirror 53 and imaged by a lens assembly 67 onto two multiple field photodetectors 68 and 69 which are mounted on the second movable platform 58. In accordance with this embodiment of the invention the light source 62 is positioned at some angle with respect to the optic axis of the eye 16 so that the fourth Purkinje image 17 and the first Purkinje image 18 are separated by some distance instead of being coincident as would be the case if the light source 62 were situated on the optic axis of the eye. The multiple field photodetectors 68 and 69 are positioned a corresponding distance apart so that the fourth Purkinje image falls on the multiple field photodetector 69 and the first Purkinje image falls on the multiple field photodetector 68.

The distance between the two photodetectors 68 and 69 is determined by how far off the optic axis of the eye the light source 62 is situated.

Figure 2:
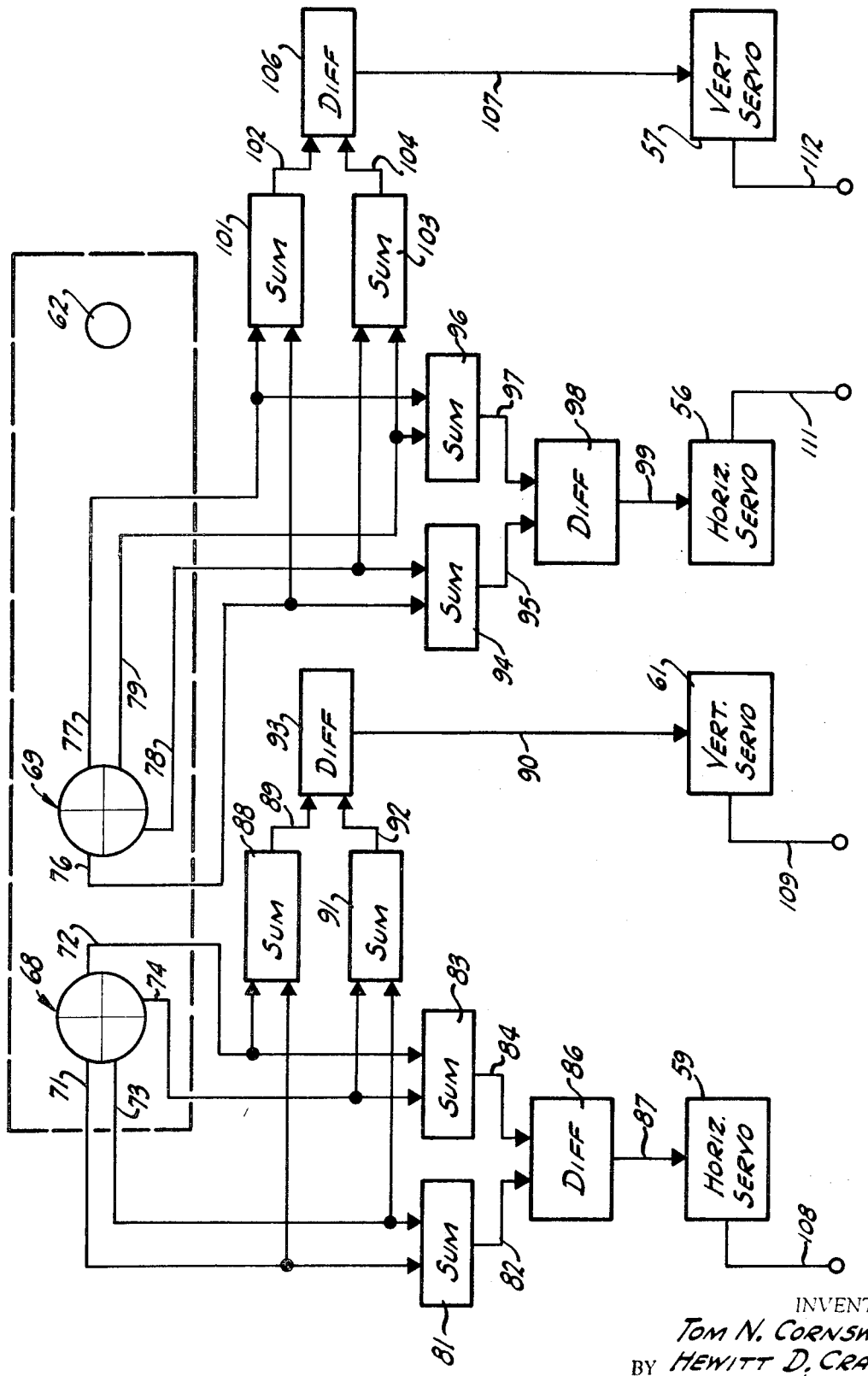
FIG. 2 is a block diagram of the electronics associated with the eye tracker of FIG. 1.

The servosystems 56, 57, 59 and 61 are driven by signals derived from the multiple field photodetectors 68 and 69. A block diagram of the system for deriving these signals is shown in FIG. 2. It will be recalled that the fourth Purkinje image falls on the multiple field photodetector 69 and the first Purkinje image falls on the multiple field photodetector 68. Each of the multiple field photodetectors 68 and 69 have four quadrant fields. Thus the multiple field photodetector 68 has four outputs 71 through 74 which carry signals representative of the light images falling on each of the four quadrants of the photodetector. Similarly, the multiple field photodetector 69 has four quadrants with four outputs 76 through 79 which correspond to the four quadrants of that photodetector and carry signals proportional to the light falling on the respective quadrants.

Outputs 71 and 73 of photodetector 68 correspond to the upper and lower left hand quadrants and these outputs are added together in a summer 81 to form a sum signal on a conductor 82. The outputs 72 and 74 which correspond to the upper and lower right hand quadrants of photodetector 68 are added together in a summer 83 to form a sum signal on a conductor 84. The sum signals on conductors 82 and 84 are subtracted by a subtractor 86 to form a difference signal on a conductor 87. If the first Purkinje image is exactly horizontally centered on the photodetector 68 then the sum signals present on the conductors 82 and 84 will be equal so that there will be no output on the conductor 87. If the first Purkinje image is not centered on the photodetector 68 then the sum signals on conductors 82 and 84 will not be equal and there will be a difference signal generated on the conductor 87. This difference signal on conductor 87 is used to drive the horizontal servosystem 59 which functions to adjust the horizontal position of the second moveable platform 58. The sign of the signal on conductor 87 determines in which direction the servosystem 59 shifts the second moveable platform 58 and the servosystem 59 shifts the moveable platform 58 until there is no difference signal on conductor 87, corresponding to horizontal centering of the first Purkinje image on the photodetector 68.

The outputs on conductors 71 and 72 which correspond to the left and right upper quadrants of the photodetector 68 are added together in a summer 88 to generate a sum signal on a conductor 89. Similarly the outputs 73 and 74 of photodetector 68 which correspond to the right and left hand lower quadrants thereof are added together in a summer 91 to form a sum signal on a conductor 92. The sum signals on conductors 89 and 92 are subtracted by a subtractor 93 to form a difference signal on a conductor 90. If the first Purkinje image is vertically centered on the photodetector 68 then the sum signals on conductors 89 and 92 will be equal so that there will be no difference signal generated on conductor 90. If the first Purkinje image is not vertically centered on the photodetector 68 then the sum signals on conductors 89 and 92 will be unequal so that a difference signal will be generated on conductor 90 proportional to the imbalance or amount of vertical displacement of the first Purkinje image on the photodetector 68. This difference signal on the conductor 90 is used to drive the vertical servosystem 61 which is utilized for moving the second moveable platform 58 in a vertical direction.

In a similar fashion the outputs 76 and 78 of the photodetector 69 which correspond to the upper and lower left hand quadrants of photodetector 69 are summed by a summer 94 to generate a sum signal on conductor 95. The outputs 77 and 79 which correspond to the upper and lower right hand quadrants of photodetector 69 are summed in a summer 96 to yield a sum signal on conductor 97. The sum signals on conductors 95 and 97 are subtracted by a subtractor 98 to yield a difference signal on conductor 99.

The quadrants of photodetector 69 are also connected in upper and lower pairs. That is, the outputs 76 and 77 are added together in a summer 101 to yield a sum signal on conductor 102. The outputs 78 and 79 corresponding to the right and left hand lower quadrants of photodetector 69 are added together in a summer 103 to yield a difference signal on a conductor 104. The sum signals on conductors 102 and 104 are subtracted by a subtractor 106 to yield a difference signal on conductor 107. The difference signal on conductor 99 corresponds to an imbalance of an image on photodetector 69 with respect to the horizontal direction and the difference signal on conductor 107 corresponds to an imbalance of an image on photodetector 69 with respect to the vertical direction. The signals on conductor 99 is used to drive the horizontal servosystem 56 which adjusts the horizontal position of the first moveable platform 54. The difference signal on conductor 107 is used to drive the vertical servosystem 57 which is adapted to adjust the vertical position of the first moveable platform 54.

The eye tracker of FIGS. 1 and 2 operates in the following manner. Suppose the eye undergoes a pure horizontal translation. This will move the first and fourth Purkinje images 18 and 17 the same amount. The fourth Purkinje image falling on photodetector 69 will move with respect to photodetector 69 so that the sum signals on conductors 95 and 97 are not equal and a difference signal is generated on conductor 99 which actuates the horizontal servosystem 56 to adjust the horizontal position of the first moveable platform 54 until the fourth Purkinje image is again centered on the photodetector 69. Movement of the first moveable platform 54 also moves the photodetector 69 and the light source 62 so that after the horizontal servosystem 56 has adjusted the position of the first movable platform 54 so that the light source 62 is oriented with respect to the optic axis of the eye 16 such that the fourth Purkinje image is centered on photodetector 69, then the first Purkinje image will also be centered on photodetector 68.

Now suppose the eye rotates, causing the fourth Purkinje image 17 and the first Purkinje image 18 to move through different distances. This causes the fourth Purkinje image 17 to be decentered on the photodetector 69 such that the horizontal servosystem 56 and the vertical servosystem 57 begin adjusting the position of the first moveable platform 54 and hence the source 62 to adjust the position of the source 62 with respect to the optic axis of the eye 16 so that the fourth Purkinje image will be centered on the photodetector 69. In the meantime the first Purkinje image will have been decentered with respect to the photodetector 68 and the horizontal servosystem 69 and the vertical servosystem 61 are shifting the second movable platform 58 in order to keep the first Purkinje image centered on the photodetector 68. Thus, when the first movable platform 54 and the second movable platform 58 come to rest again, the fourth and first Purkinje images will again be centered on their respective photodetectors 69 and 68 and the light source 62 will have moved with respect to the optic axis of the eye just enough so that the axis of the collimated input beam 66 is at the same angle with respect to the optic axis of the eye so that the fourth and first Purkinje images have the same separation as the photodetectors 68 and 69.

The servosystems 59, 61, 56 and 57 have respective position output signals on conductors 108, 109, 111 and 112. The position output signals are indicative of the vertical and horizontal positions of the first moveable platform 54 and the second movable platform 58, which positions are proportional to and indicative of the orientation of the optic axis of the eye 16.

The specific embodiment shown in FIGS. 1 and 2 contains no moveable mirrors. There is nothing fundamental about that, however. If both the collimated input beam and the output Purkinje images were reflected from a mirror that could move to deflect the light both vertically and horizontally, the motion of that mirror could be substituted for the motion of the second moveable platform 58. In fact, if desired, the dichroic mirror 53 itself can be rotated in two dimensions to achieve one set of motions. The basic principle is that there are two degrees of freedom in moving the first Purkinje image and two degrees more of freedom in moving the fourth Purkinje image, and that these four motions are at least partly independent of each other. In principle, satisfactory results can be obtained no matter how these movements are achieved, whether by reflections from mirrors, translations of moveable platforms, or combinations of those things.

FIGS. 3 and 4 show another embodiment of an eye tracker in accordance with this invention which utilizes a technique described in a co-pending application entitled "Method for Discriminating Against Masking Reflections," Ser. No. 111,280, filed February 1, 1971, and assigned to the assigneee of the present invention. Referring to FIG. 3 and FIG. 3a (which shows an enlarged view of the eye illustrating the cornea and the lens contained therein), two light sources 113 and 114 are provided for flooding the eye 116 with light. The light source 113 is an ultraviolet light source and the light source 114 is an infrared light source. A beam splitter 117 is provided for optically coupling the ultraviolet light source 113 and the infrared light source 114 through a lens 118 to a dichroic mirror 119, which reflects the light into the eye 116. The eye 116 will not be aware of either the ultraviolet or infrared light and may be looking through the dichroic mirror 119 at a display 121. Referring specifically to FIG. 3a there is shown an enlarged view of the eye 116 and illustrating the orientation of the cornea 122 and the eye lens 123.

The ultraviolet light source 113 and the infrared light source 114 are alternated or switched on and off so that they alternately flood the eye with light. As shown in FIG. 3a, the cornea 122 will reflect both the infrared and the ultraviolet light and in accordance with this invention the intensities of the ultraviolet light source 113 and the infrared light source are adjusted so that the intensity of the infrared light reflected by cornea 122 is equal to the intensity of the ultraviolet light reflected by cornea 122. It should be recalled at this point that reflections from the cornea 122 form the first Purkinje image. The fourth Purkinje image is formed by reflections from the rear surface of the eye lens 123. As shown in FIG. 3a a portion of the infrared light from the infrared light source 114 is transmitted through the cornea and through the eye lens and reflected by the rear surface of the eye lens 123 out through the cornea 122. However, the eye lens 123 absorbs ultraviolet light very strongly and since the fourth Purkinje image has to traverse the eye lens 123 twice there will be little or no ultraviolet light from the ultraviolet light source 113 reflected from the rear surface of the eye lens 123 out through the front of the cornea 122.

Thus referring again to FIG. 3, as the ultraviolet light source 113 and the infrared light source 114 alternate, the first and fourth Purkinje images formed in the eye 116 are reflected by the dichroic mirror 119 through a lens 124 to a multiple field photodetector 126. The first Purkinje image which is formed by reflections from the cornea will be a DC signal as the ultraviolet light source 113 and the infrared light source 114 alternate since it will be recalled that the intensities of the two sources are adjusted so that the photocell outputs due to the reflections from the cornea of the light supplied by each of the sources are equal. However, the fourth Purkinje image, which is formed by reflections from the rear surface of the eye lens, will only appear on the multiple field photodetector 126 when the infrared light source 114 is illuminating the eye 116. Thus, the fourth Purkinje image falling on the multiple field photodetector 125 is an AC signal which varies as the ultraviolet light source 113 and the infrared light source 114 are alternated while the first Purkinje image appears as a DC signal as the light sources alternate.

A first movable plate 127 is provided whose position is controlled by a horizontal servosystem 128 and a vertical servosystem 129. A second movable platform 131 is also provided which is mounted on the first movable platform 127 and which is driven by a horizontal servosystem 132 and a vertical servosystem 133. The multiple field photodetector 126, the ultraviolet light source 113 and the infrared light source 114 are all mounted on the second movable platform 131. The second movable platform 131 and the lenses 124 and 118 are all mounted on the first movable platform 127. As will appear more fully hereinafter, the first moveable platform 127 and the second movable platform 131 are driven in response to the first and fourth Purkinje images sensed by the multiple field photodetector 126. Signals are derived from these first and fourth Purkinje images to move the first movable platform 127 and the second movable platform 131 so that the ultraviolet light source 113 and the infrared light source 114 are kept aligned with the optic axis of the eye 116 so that the first and fourth Purkinje images overlap. Position signals are then derived from the servosystems driving the two movable platforms and these position signals indicate the positions of the first and second movable platforms which are indicative of the orientation of the optic axis of the eye. Thus the orientation of the optic axis can be continuously tracked.

Referring now to FIG. 4, there is shown the second movable platform 131 with the multiple field photodetector 126 and the ultraviolet light source 113 and the infrared light source 114 and beam splitter 117 shown mounted thereon with the electronics shown in block diagram form for deriving signals to drive the horizontal servosystems 128 and 132 and the vertical servosystems 129 and 133. As discussed before, both the first and fourth Purkinje images are incident on the multiple field photodetector 126 with the first Purkinje image appearing as a DC light image thereon and the fourth Purkinje image appearing as an AC image thereon. The multiple field photodetector has four separate fields which will be referred to as upper right, upper left, lower right, and lower left. Each of these fields develops an electrical signal in response to the light image falling thereon, which electrical signals are present on conductors 134, 135, 136 and 137. The electrical signal on conductor 134 which corresponds to the light images detected by the upper left quadrant of multiple field photodetector 126 forms the input to a filter 138. In a similar fashion the signal on conductor 135 forms the input to a filter 139, the signal on conductor 136 forms the input to a filter 141 and the signal on conductor 137 forms the input to a filter 142. The filters 138, 139, 141 and 142 separate the input signals on conductors 134 through 137 into AC and DC components. Thus each of the filters 138, 139, 141 and 142 have an AC and a DC output which correspond respectively to the fourth and first Purkinje images falling on the upper left, lower left, lower right and upper right quadrants of the multiple field photodetector 126. These AC and DC signals are manipulated to derive signals for controlling the horizontal servosystems 128 and 132 and the vertical servosystems 129 and 133 so that both the first and fourth Purkinje images are kept centered on the multiple field photodetector 126. Thus the AC signals from filters 138 and 139 are added together in a summer 143 to develop a sum signal on conductor 144 which corresponds to the portion of the fourth Purkinje image falling on the combination of the upper left and lower left quadrants of multiple field photodetector 126. Similarly, the Ac outputs of filters 141 and 142 are added together in a summer 146 to develop a sum signal on conductor 147 which corresponds to the fourth Purkinje image falling on the upper and lower right hand quadrants of multiple field photodetector 126. The sum signals on conductors 144 and 147 form the input to a subtractor 148 which develops a difference signal on conductor 149 for driving the horizontal servosystem 128. Thus if the fourth Purkinje image is horizontally centered with respect to the multiple field photodetector 126 there will be no difference signal on conductor 149. If the fourth Purkinje image is not horizontally centered then there will be a difference signal on conductor 149 and the servosystem 128 will be actuated to drive the first moveable platform 127 until the fourth Purkinje image is centered on the multiple field photodetector 126.

In a corresponding fashion the DC outputs from the photodetector quadrants are summed by summers 149 and 151 to develop a sum signal on conductor 152 which is proportional to the light from the first Purkinje image falling on the upper and lower left hand quadrants of photodetector 126 and a sum signal on conductor 153 which is proportional to the light from the first Purkinje image which falls on the upper and lower right hand quadrants of the photodetector 126. These two sum signals on conductors 152 and 153 form the input to a subtractor 154 which develops a difference signal on a conductor 156 for driving the horizontal servosystem 132. If the first Purkinje image is horizontally centered on the photodetector 126 then there will be no difference signal on conductor 156. If the first Purkinje image is not horizontally centered on the photodetector 126 then there will be a difference signal on conductor 156 which drives the horizontal servosystem 132 for moving the second movable platform 131 to center the first Purkinje image on the photodetector 126.

A summer 157 is provided for summing the AC signals from the upper left and upper right quadrants of photodetector 126 to develop a sum signal on conductor 158 which corresponds to the portion of the fourth Purkinje image falling on the upper left and upper right quadrants of photodetector 126. A summer 159 is provided for summing the AC signals from the lower left and lower right quadrants of photodetector 126 to develop a sum signal on conductor 161 which corresponds to the portion of the fourth Purkinje image falling on the lower left and lower right quadrants of photodetector 126. The sum signals on conductors 158 and 161 form the inputs to a subtractor 162 which develops a difference signal on conductor 163 which is used to drive the vertical servosystem 133 for adjusting the position of the second moveable platform 131. If the fourth Purkinje image is centered with respect to the photodetector 126 then there will be no difference signal on conductor 163. If the fourth Purkinje image is not centered vertically with respect to the photodetector 126 then there will be no difference signal on conductor 163 which will cause the vertical servosystem 133 to adjust the position of the second moveable platform 131 until the fourth Purkinje image is centered.

A summer 164 is provided for summing the DC signals from the upper left and upper right quadrants of photodetector 126 to develop a sum signal on conductor 166. A summer 167 is provided for summing the DC signals from the lower left and lower right quadrants of photodetector 126 to develop a sum signal on a conductor 168. The sum signals on conductors 166 and 168 form the inputs to a subtractor 169 which develops a difference signal on a conductor 171 for driving the vertical servosystem 129. Thus if the first Purkinje image is vertically centered with respect to the photodetector 126, the sum signals on conductors 166 and 168 will be equal and there will be no difference signal on conductor 171. If the first Purkinje image is not centered on the photodetector 126 then the sum signals on conductors 166 and 168 will not be equal and a difference signal will be developed on conductor 171 causing the vertical servosystem 129 to adjust the position of the first movable platform 127 until the first Purkinje image is centered on the photodetector 126.

The horizontal servosystems 128 and 132, beside horizontally driving the first moveable platform and the second movable platform 131 respectively, have position output signals on conductors 172 and 173. In a similar fashion the vertical servosystems 129 and 133 besides vertically driving the first moveable platform 127 and the second movable platform 131, have position outputs 174 and 174, respectively. The position output signals on conductors 172 through 175 continuously describe the position of the first moveable platform 127 and the second movable platform 131. These first and second movable platforms 127 and 131 are driven to keep the ultraviolet light source 113 and the infrared light source 114 oriented exactly on the optic axis of the eye 116 so that the first and second Purkinje images are both centered horizontally and vertically on the multiple field photodetector 126. Thus the position output signals 172 through 175 uniquely describe the orientation of the optic axis of the eye and thus serve as eye tracking signals. These eye tracking signals give information as to where the eye 116 is looking at any particular instant.

Thus what has been described is an improved eye tracker which requires no direct attachment to the eye and which is accurate to better than one-half degree. Although particular embodiments of the invention have been described it is contemplated that minor modifications and changes may be made to the embodiments disclosed herein without departing from the true spirit and scope of the invention.

We claim:

1. An eye tracker for continously tracking orientation of an optic axis of an eye having a cornea and a lens where the eye can translate in a horizontal and a vertical direction and also rotate in a horizontal and a vertical direction comprising light source means for forming a light beam, optical means for directing said light beam into the eye whereby light reflected by the cornea forms a first Purkinje image and light reflected by the rear of the eye lens forms a fourth Purkinje image, photodetecting means for generating electrical signals in response to said first and fourth Purkinje light images falling thereon, centering means responsive to said electrical signals for centering the first and fourth Purkinje images on said photodetecting means, said centering means including means for moving both said photodetecting means and said light source means, and said centering means developing position signals indicative of the orientation of the optic axis of the eye.

2. An eye tracker for continously tracking orientation of an optic axis of an eye having a cornea and a lens where the eye can translate in a horizontal and a vertical direction and also rotate in a horizontal and a vertical direction comprising a first moveable platform having a horizontal servo for causing movement in a horizontal plane and having a vertical servo for causing movement in a vertical plane, a second moveable platform mounted on said first moveable platform and moveable with respect thereto, said second moveable platform having a horizontal servo for causing movement in a horizontal plane and having a vertical servo for causing movement in a vertical plane, light source means mounted on said second movable platform for flooding the eye with light whereby light reflected by the cornea forms a first Purkinje image and light reflected by the rear of the eye lens forms a fourth Purkinje image, a first Purkinje image detector having an electrical output and a fourth Purkinje image detector having an electrical output, said first and fourth Purkinje image detectors mounted on said second movable platform, means responsive to said electrical output of one of said first and fourth Purkinje image detectors for controlling one of said horizontal servos for moving one of said first and second movable platforms whereby the Purkinje image associated with said one of said first and fourth Purkinje image detectors is horizontally centered thereon and means responsive to said electrical output of said one of said first and fourth Purkinje image detectors for controlling one of said vertical servos for moving one of said first and second movable platforms whereby the Purkinje image associated with said one of said first and fourth Purkinje image detectors is vertically centered thereon, means responsive to said electrical output of said other of said first and fourth Purkinje image detectors for controlling the other of said horizontal servos for moving the other of said first and second movable platforms whereby the Purkinje image associated with said other of said first and fourth Purkinje image detectors is horizontally centered thereon and means responsive to said electrical output of said other of said first and fourth Purkinje image detectors for controlling the other of said vertical servos for moving the other of said first and second movable platform whereby the Purkinje image associated with said other of said first and fourth Purkinje image detectors is vertically centered thereon, said horizontal and vertical servos generating position signals indicative of the vertical and horizontal positions of said first and second movable platforms, which position signals contain information about the orientation of the optic axis of the eye.

3. An eye tracker in accordance with claim 2 wherein said light source means comprises an infrared light source.

4. An eye tracker in accordance with claim 2 wherein said first and fourth Purkinje image detectors comprise multiple field photodetectors.

5. An eye tracker in accordance with claim 4 wherein said multiple field photodetectors each have an upper left, an upper right, a lower left and a lower right field, each of said fields having an electrical output proportional to the light image falling thereon.

6. An eye tracker in accordance with claim 5 wherein said means responsive to said electrical output of one of said multiple field photodetectors for controlling one of said horizontal servos comprises first summer means for summing the electrical output signals of said upper left and lower left fields of said one multiple field photodetector to form a first sum signal, second summer means for summing the electrical output signals of said upper right and said lower right fields of said one multiple field photodetector to form a second sum signal, and first subtractor means for subtracting said first sum signal from said second sum signal to form a first difference signal for controlling said one of said horizontal servos.

7. An eye tracker in accordance with claim 6 wherein said means responsive to said electrical output of one of said multiple field photodetectors for controlling one of said vertical servos comprises third summer means for summing the electrical output signals of said upper left and upper right fields of said one multiple field photodetector to form a third sum signal, fourth summer means for summing the electrical output signals of said lower right and lower left fields of said one multiple field photodetector to form a fourth sum signal, second subtractor means for subtracting said third sum signal from said fourth sum signal to form a second difference signal for controlling said one of said vertical servos.

8. An eye tracker for continuously tracking orientation of an optic axis of an eye having a cornea and a lens where the eye can translate in a horizontal and a vertical direction and also rotate in a horizontal and a vertical direction comprising alternately excited first and second light sources, said first light source adapted to generate an infrared light beam and said second light source adapted to generate an ultraviolet light beam, means for directing said infrared and ultraviolet beams into the eye whereby first Purkinje images are formed by reflections of said infrared and ultraviolet light beams by the cornea and wherein a fourth Purkinje image is formed only by reflection of said infrared light beam from the rear of the eye lens, the eye lens strongly absorbing the ultraviolet light beam, photodetecting means for generating electrical signals in response to light images falling thereon, centering means responsive to said electrical signals centering the first and fourth Purkinje images on said photodetecting means, said centering means generating position signals indicative of the orientation of the optic axis of the eye.

9. An eye tracker in accordance with claim 8 wherein said photodetecting means comprises a multiple field photodetector and wherein the electrical signals generated thereby include DC signals corresponding to the first Purkinje image and AC signals corresponding to said fourth Purkinje image.

10. An eye tracker in accordance with claim 9 including filter means for separating said AC signals and said DC signals.

11. An eye tracker in accordance with claim 10 wherein said centering means comprises apparatus for moving said first and second light sources and said photodetecting means so that the infrared and ultraviolet light beams are directed into the eye along its optic axis whereby the first and fourth Purkinje images are coincident and centered on said photodetecting means.

12. An eye tracker in accordance with claim 10 wherein said centering means comprises apparatus for changing the orientation of said infrared and ultraviolet light beams with respect to the optic axis of the eye until the first and fourth Purkinje images are coincident and centered on said photodetecting means.

* * * * *